United States Patent [19]
Galder

[11] Patent Number: 5,510,135
[45] Date of Patent: Apr. 23, 1996

[54] APPARATUS AND METHOD FOR CONNECTED FORMING AND CONTROLLED STACKING OF MATERIAL

[76] Inventor: John Galder, 5321 Industrial Oaks, Blvd., Austin, Tex. 78735

[21] Appl. No.: 264,508

[22] Filed: Jun. 23, 1994

[51] Int. Cl.$^6$ ................................................. A21C 11/00
[52] U.S. Cl. ........................... 426/512; 426/76; 426/389; 426/391; 426/496; 426/516; 53/447; 425/588; 249/119; 249/130
[58] Field of Search .................... 426/128, 389, 426/391, 393, 407, 412, 496, 512, 516, 76; 53/447; 425/215, 298, 588; 249/119, 130

[56] References Cited

U.S. PATENT DOCUMENTS

| | | | |
|---|---|---|---|
| 2,843,493 | 7/1958 | Sharples | 426/512 |
| 3,120,112 | 2/1964 | Davis | 249/130 X |
| 3,456,301 | 7/1969 | Murroni | 249/119 X |
| 3,866,741 | 2/1975 | Carbon et al. | 198/35 |
| 4,074,509 | 2/1978 | Miles | 53/122 |
| 4,236,855 | 12/1980 | Wagner et al. | 414/42 |
| 4,276,800 | 7/1981 | Koppa et al. | 425/298 X |
| 4,421,222 | 12/1983 | Stuermer | 198/382 |
| 4,529,082 | 7/1985 | Mally | 198/434 |
| 4,630,725 | 12/1986 | Steurmer | 198/425 |
| 4,662,152 | 5/1987 | Simelunas et al. | 53/246 |
| 4,736,570 | 4/1988 | Hardage et al. | 53/443 |
| 5,077,074 | 12/1991 | Van Lengerich | 426/549 |
| 5,078,255 | 1/1992 | Haley | 198/358 |
| 5,094,585 | 3/1992 | Cruver | 414/790.3 |
| 5,095,684 | 3/1992 | Walker et al. | 53/443 |
| 5,149,594 | 9/1992 | Lewandowski et al. | 426/503 |
| 5,165,218 | 11/1992 | Callahan, Jr. | 53/447 |

FOREIGN PATENT DOCUMENTS

| | | | |
|---|---|---|---|
| 24057 | 1/1907 | United Kingdom | 426/76 |
| 342967 | 2/1931 | United Kingdom | 426/76 |

OTHER PUBLICATIONS

Webster's II New Riverside University Dictionary, 1988, p. 763.

*Primary Examiner*—Donald E. Czaja
*Assistant Examiner*—Milton I. Cano
*Attorney, Agent, or Firm*—J. Nevin Shaffer, Jr.; Shaffer & Culbertson

[57] ABSTRACT

An apparatus and method for connected forming and controlled stacking of material having a form (12). The form (12) includes at least two molds (14) connected to each other by a web (16). The introduction of material into the form (12) results in the material generally assuming the shape of the molds (14) and the web (16). As a result, when the material is pressed out of the molds (14), the material is held together in the preselected position by the resultant web (16). This enables the stacking of material on top of each other in a controlled and certain manner since the forms pressed from the molds (14) will retain their chosen spaced apart distance and fall consistently and uniformly on top of each other until such time as the desired height of stacked material is achieved. In particular, in the cookie industry, uncooked cookie dough can be formed by utilization of a plurality of molds (14) interconnected to each other by a web of cookie dough so that uncooked, unfrozen, cookie dough can be stacked to desired a height and desired numbers in preselected economically sized boxes. Once stacked, the cookies can then be allowed to age, prior to being frozen, thus enhancing the taste of the resulting baked cookie.

10 Claims, 2 Drawing Sheets

APPARATUS AND METHOD FOR CONNECTED FORMING AND CONTROLLED STACKING OF MATERIAL

BACKGROUND OF THE INVENTION

This invention relates to an apparatus and method for connected forming and controlled stacking of material.

A need for effectively forming and stacking multiple forms has existed for quite some time. The advent of the industrial revolution and continued pressures to lower costs and raise quality have affected every business engaged in the processing and packaging of multiple formed products. Many devices have been developed in various industries to automate the processing so that economical stacks of similar objects can be produced by machine. The Carbon et at. device, U.S. Pat. No. 3,866,741; the Miles device, U.S. Pat. No. 4,074,509; the Wagner et at. device, U.S. Pat. No. 4,236,855; the Steurmer devices, U.S. Pat. Nos. 4,421,422 and 4,630,725; the Mally device, U.S. Pat. No. 4,529,082; the Cruver device, U.S. Pat. No. 5,094,585; and the Callahan Jr. device, U.S. Pat. No. 5,165,218 are representative of this development. In general, the apparatuses and methods disclosed in these patents deal with attempts to automate the stacking of disc-like materials, i.e. hamburgers, cookies, and the like. A general solution to the problem of dealing with raw materials is to harden them in some manner, either by freezing or cooking, so that after they have been formed and hardened, they may then be arranged by machines into certain desired stacking patterns.

A variety of cookie machines deal with the problems of handling and stacking cookies specifically. The Walker et al. device, U.S. Pat. No. 5,095,684 and the Hardage et al. device, U.S. Pat. No. 4,736,570, both deal with handling cookies that have been extruded and baked. Once baked, the cookies then can be handled and stacked in convenient and economical portions.

The extrusion of single discs onto a conveyor belt is well known in the art. The difficulty arises, however, when multiple forms are extruded at the same time and the attempt is made to form layers of multiple forms one on top of the other. That is, while multiple single layers may be possible, those layers will be non-uniform, in that, the pressed forms, if dropped as they would need to be in order to form a stack, would resultantly change their relationship to each other upon impact. The second layer, therefore, would not likely define the previous layer directly below it and the second layer itself would move in relation to the first layer. This difficulty has been overcome in the prior art by first hardening the material by freezing or cooking the discs to be stacked. Obviously, the ability to stack prior to cooking or freezing would be a distinct economic advantage.

A drawback to the frozen or cooked disc handling devices and methods known in the art, however, is that uniform stacking of multiple discs in their unhardened form has not been accomplished. Many advantages arise from an ability to stack unfrozen, uncooked, "raw" materials, in that, the forms to be stacked may frozen and/or handled after stacking. Further, in particular, in the cookie business, it is desirable to age cookie dough after forming. This aging process gives the cookie the gourmet taste preferred by consumers. Thus, there is a need in the art for providing an apparatus and method which enables the forming and stacking of uncooked, unfrozen material in its "raw" soft form, in more than single forms. It, therefore, is an object of this invention to provide an apparatus and method for connected forming and controlled stacking of material.

SHORT STATEMENT OF THE INVENTION

Accordingly, the connected forming and controlled stacking of material apparatus and method of the present invention includes a form with at least two molds for forming material. A web connects the molds so that when the material to be formed is introduced into the molds, the material in each mold is connected by a web of additional material. By this means and method, each level of material, hamburger patties, cookie dough, and so forth, can be dispensed in a manner so that each layer stays together and does not move apart from its original pressed position. Again, this is done by means of connecting the material with a small web, or connector, of the same material. The material fills not only the mold, but, also, a web form that interconnects the molds. Once the material is filled, it is pressed from the form and, as it drops to a receiving station, the webs of material between the forms hold the forms together so that they land uniformly and are uniformally spread apart and maintain that same distance when they land. Another layer then can be added on top, with another layer on top of that, and so on, until the desired height of the stack of material is achieved.

BRIEF DESCRIPTION OF THE DRAWINGS

Other objects, advantages, and features of the present invention will become more fully apparent from the following detailed description of the preferred embodiment, the appended claims and the accompanying drawings in which:

DETAILED DESCRIPTION OF THE PREFERRED EMBODIMENT

Figure 1:
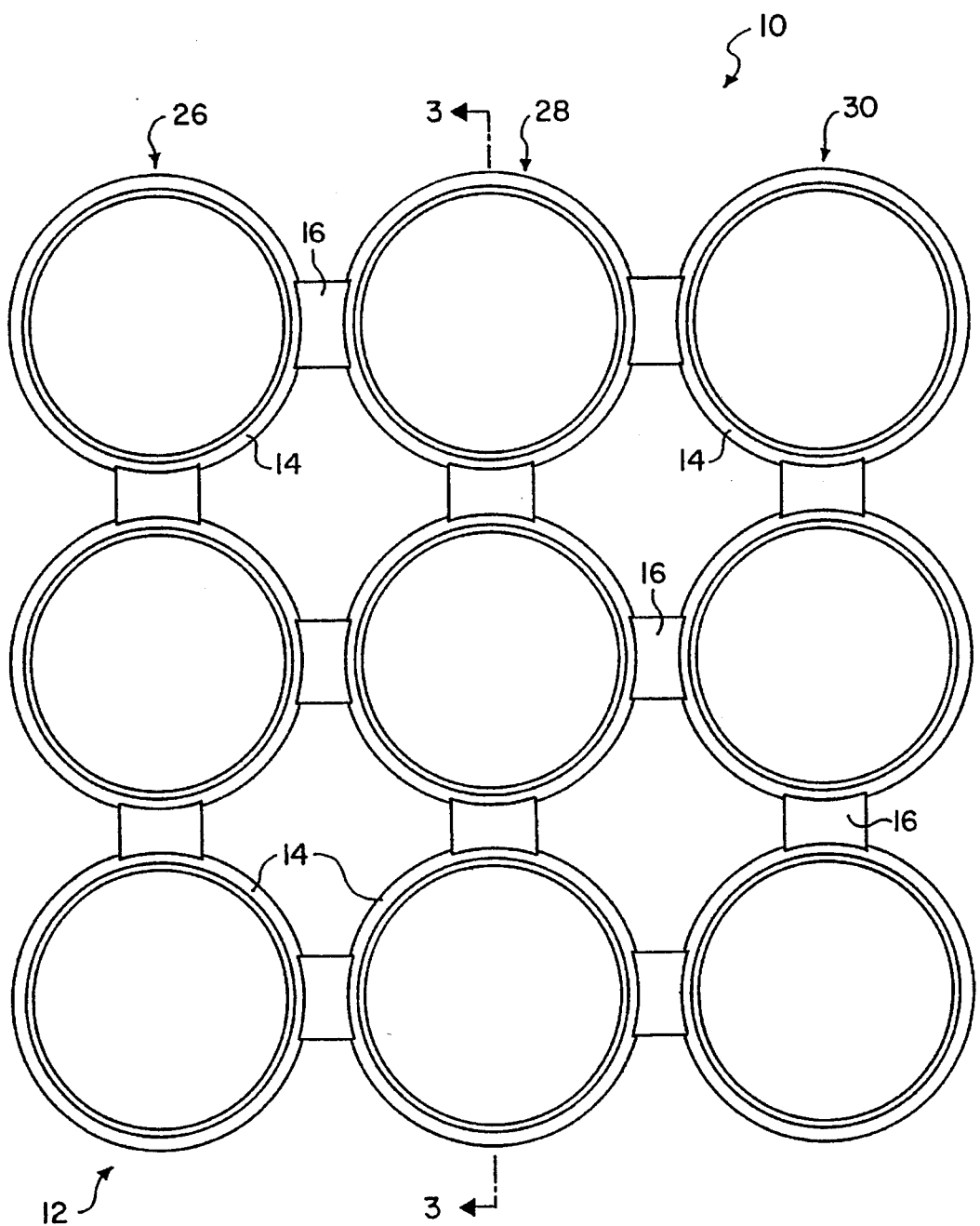
FIG. 1 is a top view of a preferred embodiment of a connected forming and controlled stacking of material apparatus of the present invention.
Figure 2:
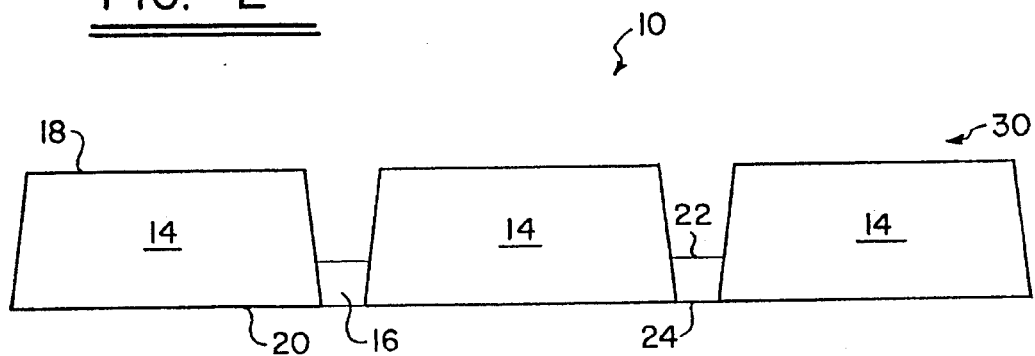
FIG. 2 is a side view of FIG. 1.
Figure 3:
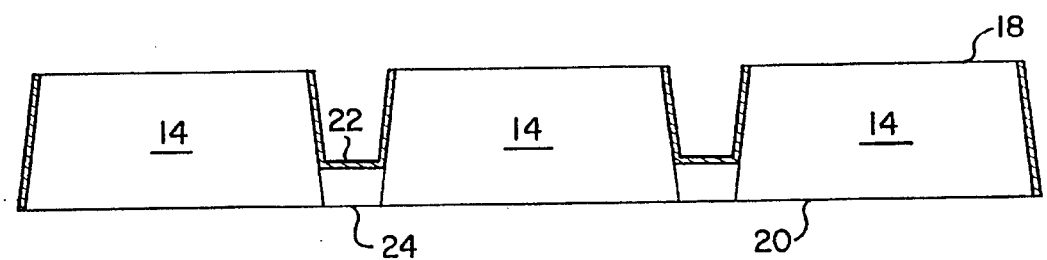
FIG. 3 is a section view of FIG. 1 taken along Line 3—3.

The preferred embodiment of the present invention is illustrated by way of example in FIGS. 1–3. With specific reference to FIG. 1, a connected forming and controlled stacking of material device 10 includes a form 12 containing two or more molds 14 which are generally in the form of a circle. Each mold 14 is connected to the adjacent mold by means of a web 16.

Referring now to FIG. 2, it can be seen that molds 14 include a top 18 and bottom 20. Web 16 also contains a top 22 and bottom 24. While the top 18 of molds 14 is open, thereby enabling the introduction of material from the top, the top 22 of web 16 is solid as clearly shown in FIG. 3. FIGS. 2 and 3 also illustrate that web 16, in a preferred embodiment, is connected at the bottom 20 edge of molds 14.

Referring to FIGS. 1, 2 and 3, a preferred embodiment of the invention is the utilization of a equal distance spacing of nine molds 14 in three spaced apart rows 26, 28 and 30. Connecting web 16 of form 12 holds molds 14 in this preselected position.

In a preferred embodiment, the top 18 of molds 14 has a dimension generally smaller than the bottom 20 dimension. In one embodiment the top dimension is 1.685 inches, while the bottom dimension is 1.765 inches. As can be seen in the FIGURES, that results in a somewhat conical shape with the narrow portion of the cone on top and the wider portion of the cone on the bottom. The width of the molds 14 can obviously vary, but in a preferred embodiment the width is 0.770 inches.

In operation, connected forming and controlled stacking of material device 10 is first connected to or located adjacent to a materials handling and extruding device. In the cookie industry, for example, this would be a machine for receiving premixed dough that insures that cookie dough is extruded into the connected forming and controlled stacking of material device 10 on demand. Such cookie dough handling and extruding devices are well known in the art and are not disclosed and discussed further herein. Having located connecting and stacking device 10 next to the cookie dough extruding device (not shown), cookie dough, or any other material, obviously, is extruded into form 12. Molds 14 of form 12 cause the material, i.e. cookie dough, hamburger and the like, to generally assume the shape of the molds 14. Obviously, molds 14 can be in any preferred size or shape, those being merely design choices.

The process of introducing material into molds 14 also results in material being introduced into web 16, as shown in FIG. 3, because the top 22 of web 16 is sealed, material forced into molds 14 is also forced into web 16 and assumes the shape of web 16.

A movable bottom for molds 14 and web 16 is provided, as is known in the art, so that material introduced into the molds and webs meets resistance and the material is forced to assume the shape of the molds 14 and web 16. This movable bottom (not shown) is known in the art, and not disclosed further herein. Once the material has been completely introduced into form 12, the movable bottom, as discussed above, is removed and the material can be removed from the molds 14 in any manner known in the art, i.e. by pressing, or ejecting, or some other fashion.

The material now formed generally in the shape of molds 14 is connected by webs of material in the shape of web 16. As a result, multiple formed "discs" of material can be stacked layer upon layer. That is, the formed and connected material can be dropped to a receiving area with the sure knowledge that the material will retain the spaced apart relation of the form 12. That is, the individual discs will not bounce or move away from their predetermined relationship because of the web of material formed by web 16. This enables the user to place another layer of molded material directly on top of the previous layer, with the sure knowledge that they will land uniformally and be kept uniformally spread apart and that the desired spread will be maintained when the multiple forms land. Therefore, layer after layer of material can be added on top of one another until the desired height of the stack is achieved.

By means of the present invention, raw, unhardened, uncooked, unfrozen material can now be successfully stacked and packaged. As a result, these materials can be frozen in their packaged condition when desired. In particular, in the cookie industry, it is desirable that such a stacking of uncooked cookie dough be enabled. This is because the cookie dough can be thicker and still stacked in multiple forms. The thicker cookie dough mirrors the best homemade cookie doughs because it will not need to be thinned to be properly disbursed and stacked. Also, the efficiency in stacking allows the product to be stacked prior to freezing which allows time for the cookie dough to age which increases the good taste of the cookies. Once the cookie dough, in its stacked boxed condition, has been aged the desired amount of time, the entire box can then be frozen.

By way of a complete understanding of the utilization of the formed materials in the cookie field, it should be understood that the cookie dough, once frozen, will be utilized in the following manner. When it is desired that the cookies be baked, the formed connected cookies are separated simply by breaking the connection. The broken apart cookies are then placed on a cookie sheet as desired. The cooking process will incorporate the small amount of webbing material into the cookie so that it is not noticeable once the cookie dough has been baked. Additionally, the cookie material can be broken apart and formed by hand into other shapes, if desired. This hand forming can also accommodate the incorporation of the small amount of web material into the cookie form to be cooked. In any event, whatever process or method is used after the cookie forms are broken apart, the web material does not present an unusual appearance because it is absorbed by the cookie in the cooking process.

In summary, the inventor has devised a means by which material in its raw form, in particular in the cookie dough form, may be stacked. The apparatus and method enables each level of cookie dough to be dispersed in a manner so that the cookies stay together and do not move apart from their original pressed position. This is done by means of connecting the cookies with a small web, or connector, of dough. Dough fills not only the cookie form, but also the web form that interconnects the cookie forms. Once the dough is filled, it is pressed from the form and, as it drops, the webs between the cookie forms hold the cookie forms together so that they land uniformally, are uniformally spread apart, and maintain that distance when they land in the receiving area. Another layer can then be added on top, with another on top of that one, and so on and so on, until the desired height of the stack of cookies is achieved.

While the connected forming and controlled stacking of material device of the present invention has been disclosed in general with the connection of any type of material, it is clear that the preferred embodiment of the invention is utilized with uncooked, unfrozen cookie dough. Nonetheless, it should be appreciated that the connected forming and controlled apparatus and method of the present invention can be used with other materials. The present invention provides advantages in any environment where it is desirable to handle untreated material and stack it first prior to any hardening process. The result of the advantages is reduction in cost, time, and labor. Thus, the present invention includes clear advantages over prior art inventions.

While the present invention has been disclosed in connection with the preferred embodiment thereof, it should be understood that there may be other embodiments which fall within the spirit of scope of the invention as defined by the following claims.

I claim:

1. In a cookie forming device wherein raw, soft, cookie dough is introduced into forms so that a layer of more than one cookie of dough is pressed out on a previously formed layer, an apparatus for ensuring each layer is accurately and consistently stacked on top of the other layer without having to first freeze or cook the raw, soft, cookie dough, the device comprising:

a) at least two mold means for receiving the cookie dough temporarily and causing the raw, soft, cookie dough to generally assume the shape of the mold, the mold means having two openings:

(i) a first top opening for receiving the material to be formed; and (ii) a second bottom opening for releasing the material once formed; and b) a web forming means for interconnecting the mold means so that as the cookie dough is pressed out from the mold means, the resultant cookie dough forms are connected by a web of cookie dough as the dough drops onto the previously formed layer.

2. The apparatus of claim 1 wherein the mold means further comprises a plurality of molds each connected to an adjacent mold by a web means.

3. A method of forming raw, soft, material to be stacked so that it can be controlled and stacked uniformally while still raw and soft comprising the steps of:
  a) introducing raw, soft, material to be formed into a mold means with at least two separate molds the mold means formed so as to have two openings:
    (i) a first top opening for receiving the material to be formed; and
    (ii) a second bottom opening for releasing the material once formed;
  b) temporarily containing the raw, soft, material in the mold means so that the raw soft, material generally assumes the shape of the two molds;
  c) connecting the two mold means with a web forming means so that when raw, soft, material is introduced to the mold means, the raw, soft, material in each mold is connected by a web of additional raw, soft, material; and
  d) pressing the raw, soft, material, generally in the shape of the mold, from the mold means while connected to each molded shape by the web of raw, soft, connecting material.

4. The method of claim 3 further comprising the steps of:
  a) providing mold means with a plurality of separate molds; and
  b) connecting each of the plurality of separate molds to the mold adjacent to it with a web forming means so that when the raw, soft, material is introduced into the mold means, raw, soft, material in each mold is connected to the adjacent mold by a web of raw, soft, material.

5. The method of claim 3 further comprising the step of constructing the mold means with nine separate molds arranged in rows of three.

6. The method of claim 3 further comprising the step of constructing the mold means with a top and bottom so that the dimension of the top is generally smaller than the dimension of the bottom.

7. A method of forming cookie dough wherein the cookie dough is introduced into forms so that a layer of more than one cookie of dough is pressed out onto previously formed layers while ensuring that each layer is accurately and consistently stacked on top of the other without having to first cook or freeze the cookie dough comprising the steps of:
  a) creating raw, soft, cookie dough;
  b) introducing the raw, soft, cookie dough to at least two mold means for receiving the raw, soft, cookie dough temporarily so that the raw, soft, cookie dough generally assumes the shape of the mold, the mold means formed so as to have two openings:
    (i) first top opening for receiving the material to be formed; and
    (ii) second bottom opening for releasing the material once formed;
  c) interconnecting the two mold means with a web form so that when the raw, soft, cookie dough is introduced to the mold means, resultant raw, soft, cookie dough forms are connected by a web of raw, soft, cookie dough; and
  d) pressing the raw, soft, cookie dough from the mold means so that the web of raw, soft, cookie dough maintains the raw, soft, cookie dough forms in a predetermined spaced apart relation of the mold means after leaving the mold means.

8. An apparatus for connected forming and controlled stacking of material comprising:
  a) form means with at least two molds for forming material, the molds having two openings:
     a first top opening for receiving the material to be formed; and
     a second bottom opening for releasing the material once formed; and
  b) a web forming means connecting the molds so that when the material to be formed is introduced into the molds, the material in each mold is connected by the web means with additional material.

9. Apparatus of claim 8 further comprising:
  a) a form means with nine molds spaced apart from each other in rows of three; and
  b) a web means interconnecting each of the nine molds.

10. The apparatus of claim 9 wherein the web means further comprises:
  a) connecting each mold at least once to each adjoining mold.

* * * * *

UNITED STATES PATENT AND TRADEMARK OFFICE
CERTIFICATE OF CORRECTION

PATENT NO. : 5,510,135
DATED : April 23, 1996
INVENTOR(S) : Glader, John It is certified that error appears in the above-identified patent and that said Letters Patent is hereby corrected as shown below:   On title page, Item (19) should read —Glader—

Item (76) Inventors:  John "Galder" should be --John Glader--

Column 6, Line 31,  "a first" should be --(i) a first--

Column 6, Line 34,  "a second" should be --(ii) a second--

Signed and Sealed this

Tenth Day of September, 1996

Attest:

BRUCE LEHMAN

Attesting Officer       Commissioner of Patents and Trademarks